United States Patent
Hang et al.

(10) Patent No.: US 11,393,321 B2
(45) Date of Patent: Jul. 19, 2022

(54) PHOTOELECTRICALLY-CHARGING GAS DETECTOR

(71) Applicant: mPower Electronics, Inc., Santa Clara, CA (US)

(72) Inventors: Yiqing Hang, Shanghai (CN); Peter C. Hsi, Dublin, CA (US); Hong T. Sun, Saratoga, CA (US)

(73) Assignee: mPower Electronics, Inc., Santa Clara, CA (US)

( * ) Notice: Subject to any disclaimer, the term of this patent is extended or adjusted under 35 U.S.C. 154(b) by 0 days.

(21) Appl. No.: 17/072,936

(22) Filed: Oct. 16, 2020

(65) Prior Publication Data

US 2021/0134137 A1    May 6, 2021

(30) Foreign Application Priority Data

Oct. 31, 2019    (CN) .......................... 201911051006.0

(51) Int. Cl.
*G08B 21/12*    (2006.01)
*H02J 7/35*    (2006.01)

(52) U.S. Cl.
CPC ............... *G08B 21/12* (2013.01); *H02J 7/35* (2013.01)

(58) Field of Classification Search
CPC ........ G08B 21/12; G08B 21/14; G08B 21/16; G08B 17/10; H02J 7/35
See application file for complete search history.

(56) References Cited

U.S. PATENT DOCUMENTS

| | | | |
|---|---|---|---|
| 5,773,833 A | 6/1998 | Hsi | |
| 6,182,497 B1 * | 2/2001 | Krajci | G01N 33/0075 73/23.2 |
| 6,469,303 B1 | 10/2002 | Sun et al. | |
| 6,888,467 B2 | 5/2005 | Green et al. | |
| 6,987,459 B2 | 1/2006 | Tice | |
| 7,244,939 B2 | 7/2007 | Stuttard | |
| 7,258,773 B2 | 8/2007 | Zhou et al. | |
| 8,080,975 B2 | 12/2011 | Bessa et al. | |
| 8,859,303 B2 | 10/2014 | Udrea et al. | |
| 9,063,105 B2 | 6/2015 | Berndt et al. | |
| 9,461,501 B2 | 10/2016 | Partovi et al. | |
| 9,625,406 B2 | 4/2017 | Zanella, Sr. | |
| 9,739,762 B2 | 8/2017 | Scmidlin et al. | |
| 9,874,342 B1 * | 1/2018 | Liu | A42B 3/046 |

(Continued)

FOREIGN PATENT DOCUMENTS

CA    2345801 C    6/2005
CN    203073373 U    7/2013

(Continued)

*Primary Examiner* — Orlando Bousono
(74) *Attorney, Agent, or Firm* — David T. Millers (57) ABSTRACT

A gas detecting system includes a detector having a housing, a sensor module, a controller, energy storage, and a photoelectric conversion component. The photoelectric conversion component may be mounted in or on the housing to provide electrical power to the energy storage while the energy storage powers the detector. Accordingly, the photoelectric conversion component can extend working time of the detector beyond the normal capabilities of the energy storage alone. The gas detecting system may further include a charger that provides concentrated light for charging or operation of the detector.

2 Claims, 6 Drawing Sheets

(56) References Cited

U.S. PATENT DOCUMENTS

| | | | |
|---|---|---|---|
| 10,001,427 B2 | 6/2018 | Augusto | |
| 10,461,531 B2 | 10/2019 | Ellenberger | |
| 10,788,417 B2 | 9/2020 | Le | |
| 2007/0012349 A1* | 1/2007 | Gaudiana | G06Q 30/00 |
| | | | 136/244 |
| 2008/0117066 A1* | 5/2008 | Kononov | G01N 33/0009 |
| | | | 340/632 |
| 2008/0198583 A1* | 8/2008 | McMillen | H04R 1/028 |
| | | | 362/147 |
| 2008/0246844 A1* | 10/2008 | Chan | F21V 23/0471 |
| | | | 348/152 |
| 2015/0316472 A1* | 11/2015 | Yon | G08B 21/16 |
| | | | 356/437 |
| 2016/0189520 A1* | 6/2016 | Papageorge | G01N 33/0036 |
| | | | 340/632 |

FOREIGN PATENT DOCUMENTS

| | | |
|---|---|---|
| EP | 1293946 B1 | 2/2006 |
| EP | 2128686 B1 | 7/2017 |
| FR | 3072775 B1 | 9/2019 |
| JP | 3778341 B2 | 5/2006 |
| JP | 5748211 B2 | 7/2015 |

* cited by examiner

PHOTOELECTRICALLY-CHARGING GAS DETECTOR

BACKGROUND

Industrial processes often produce gases that may be toxic, corrosive, flammable, or explosive. Since many of these gases cannot be seen, gas detection is critical to avoiding serious safety hazards, and gas detectors, e.g., electrochemical, catalytic combustion, infrared, PID, and other sensors, are commonly used to detect low-concentration gas and provide early warnings of dangerous gases. Gas detectors may be portable, e.g., worn or carried by a user in area where exposure is possible, or fixed, e.g., mounted and wire in a facility or other location where targeted gases may be generated. At present, portable and many fixed gas detectors use batteries for primary or backup electrical power, but a battery can only provide operating power for a limited time before requiring recharging or replacement. Another drawback of battery-powered gas detectors is the premature end of their working hours (or between-charges time) if an abnormal alarm or other power drain occurs. Increasing the working hours of a battery-powered gas detector generally requires increasing the battery capacity, which increases cost. At the same time, due to the limitations of battery energy density and instrument volume, available space limits increases in battery capacity.

Most portable single-gas detectors currently that use rechargeable and primary batteries require regular charging and commonly fail after a couple of years of use, and industrial workers throw away a few million "disposal" gas detectors every year. This practice multiplies new purchases and creates waste and environmental pollution. The throwaway trend is expanding into multi-gas detectors and other instruments, which generally require more power (and larger batteries), cost more to manufacture, and produce more disposal waste and pollution.

SUMMARY

In accordance with an aspect of the invention, a gas detector or other detection and alarm instrument uses photoelectric charging, which can receive light energy where and while the detector or instrument is being used. Continuous photoelectric charging can provide or supplement the energy that the instrument needs to continue operating for extended working hours. Additionally, photoelectric charging may charge batteries of the gas detector or other detection and alarm instrument when the detector or instrument is not in use.

One example of the present disclosure is a gas detecting system that includes a detector. The detector has a housing, a sensor module, a controller, energy storage, and a photoelectric conversion component such as a photoelectric cell. The sensor module is configured to sense a target gas, and the controller receives a sensing signal from the sensor module. The energy storage provides electrical power the controller and the sensor module. The photoelectric conversion component, which may be mounted in or on the housing, provides electrical power to the energy storage while the energy storage powers the controller and the sensor module. Accordingly, use of the photoelectric conversion component can extend working time (between recharging of the energy storage) of the detector beyond the normal capabilities of the energy storage alone. An isolation protection circuit may be provided between the photoelectric conversion component and the electric energy storage device in some examples of the present disclosure.

In another example of the gas detection system, the interior of the housing of the detector may include the storage module, the controller, the electric energy storage device, and a communication module, which may be hermetically sealed and protected inside the housing. The electric energy storage device may be electrically connected to the communication module. The controller is also connected to the communication module, the storage module, the sensor module, an alarm module, and a display screen.

The housing may have a transparent structure. When the housing has a transparent structure, the photoelectric conversion component may be inside of the body and positioned to receive light through the transparent structure. In one specific example, a gas detector has a transparent housing and a photoelectric conversion component that includes a flexible thin-film solar cell bonded to the inner wall of any side wall of the housing, except where a display screen or other opaque structure is glued or otherwise provided on the housing. In another specific example, the transparent structure may be a transparent window provided on the side wall of the housing, and the photoelectric conversion component may be a solar cell provided inside the housing and bonded to the transparent window by transparent structural glue.

When the housing does not have a transparent structure, the photoelectric conversion component may be on the exterior of the housing. For example, the gas detector may have an opaque case without any transparent area suitable for a photoelectric conversion component, and the photoelectric conversion component may be a flexible thin-film solar cell externally fixed to the exterior of any wall of the housing not occupied by a display screen or other external components of the detector. A transparent protective layer such as a polyethylene coating or an epoxy resin coating may be provided on the surface of any external photoelectric conversion component.

In another example, all or a portion of the housing of the detector may be covered with a layer of solar coating or solar paint.

A gas detector and alarm according to examples disclosed herein may provide external communication through a communication module such as a built-in wireless or infrared module, which may be used for data downloads, firmware upgrades, real-time monitoring systems, and asset tracking networks. The photoelectrically charged power and built-in communication allow an instrument housing or enclosure to be completely and permanently sealed, e.g., hermetically sealed, to maximize the ingress rating and operation durability of the gas detector.

In yet another example of the present disclosure, the gas detecting system may employ a charger in a separate structure separate from the gas detector. The charger may, for example, include a base, a support rod is fixed to the base, a mounting base is fixed to the top of the support rod, and several lamp holders are connected to a bottom of the mounting base. A lamp or other light source may be installed at the bottom of each lamp holder, and the lamp sources may be used to provide light energy for the photoelectric conversion component of the gas detector.

One or more lampshades may surround the periphery of each lamp source or the periphery of all or a collection of the lamp sources. Each lampshade may have a bottom opening, and a reflective or mirror layer may be on the inner wall of each lampshade. A further reflective mirror layer may be on the outer wall of the bottom of the mounting base. A convex lens may be in the bottom opening of a lampshade to concentrate light on an area where the photoelectric conversion component of the gas detector can receive the light. Each lamp source may include one of an incandescent lamp, an LED lamp, a fluorescent lamp, an infrared laser diode, and a halogen lamp.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

A gas detecting system may include a detector having a housing, a sensor module, a controller, energy storage, and a photoelectric conversion component. The photoelectric conversion component may be mounted in or on the housing to provide electrical power for operation of the detector and particularly to provide power to the energy storage while the energy storage powers the detector. Accordingly, the photoelectric conversion component can extend working time of the detector beyond the normal capabilities of the energy storage alone. The gas detecting system may further include a charger that provides concentrated light for charging or operation of the detector. The charger may have one or more reflective lampshades and lenses to concentrate light from multiple light sources.

Figure 1:
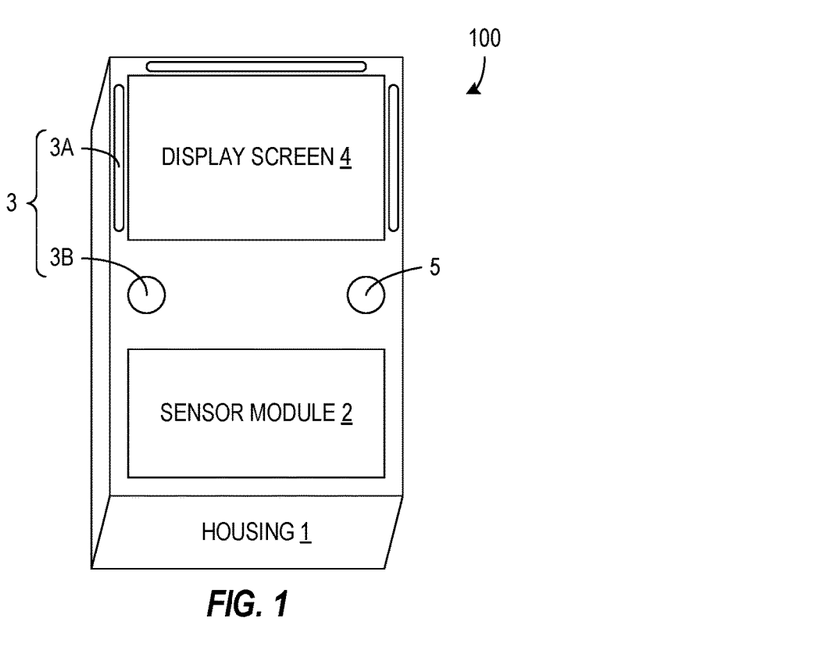
FIG. 1 is a perspective view of a gas detector in accordance with one example of the present disclosure.

FIG. 1 shows a perspective view of a photoelectrically-charging gas detector 100, sometimes referred to herein as detection and alarm instrument 100. Detector 100 includes a casing or housing 1, a sensor module 2, an alarm module 3, a display screen 4, and a switch 5. Housing 1 contains and protects electronic elements and may be made of a resilient material such as metal or plastic. Sensor module 2, alarm module 3, display screen 4, and switch 5 are on a one wall, e.g., the front, of the housing 1 with all or at least a portion of each of sensor module 2, display screen 4, and switch 5 being external to housing 1 and accessible to a user of device 100.

Sensor module 2 may be attached to the interior or exterior of a wall (e.g., the front) of housing 1 and may have portions that extend through the wall or reside outside of the wall. Sensor module 2 is generally configured to detect one or more targeted types or species of gas that may be present in an environment surrounding detector 100. Sensor module 2 may particularly including passive components, e.g., ducts, or active sampling systems, e.g., a fan or diaphragm pump, that convey gas samples from the environment around detector 100 to a sensing system. The sensing system may use any conventional sensing technology. For example, sensor module 2 may include one or more of an electrochemical sensor, a catalytic combustion sensor, an infrared gas sensor, and a (Photo-Ionization Detection) PID sensor according to needs and intended use of detector 100.

Alarm module 3 includes systems for producing an alarm that alerts a user to a sensed condition that may be dangerous or may otherwise require the user's attention. In the illustrated example, alarm module 3 includes an LED light 3A, which detector 100 may flash with a characteristic pattern or color for a warning or an alarm, and an alarm buzzer, bell, speaker, or horn 3B, which detector 100 may sound to produce an audible noise.

Display screen 4 may be a liquid crystal display (LCD) or other conventional display device used to convey information to the user. For example, detector 100 may use display screen 4 to display the status of detector 100 or current or historic measurements of particular gases. In some implementations, display screen 4 may include touch screen capabilities that allows use of display screen 4 in a user interface that gas detector 100 uses to receive user commands.

A user may operate switch 5 to control the operating mode of gas detector 100, e.g., switch detector 100 on, off, or into a power-saving mode, or to provide user commands to gas detector 100. In the illustrated configuration of FIG. 1, switch 5 is between display screen 4 and sensor module 2 on the front of housing 1, and alarm horn 3B is on the front to one side of the switch 5. LED lights 3A are provided around the upper side, the left side, and the right side of display screen 4. Many other configurations of the components of detector 100 are possible.

Figure 2:
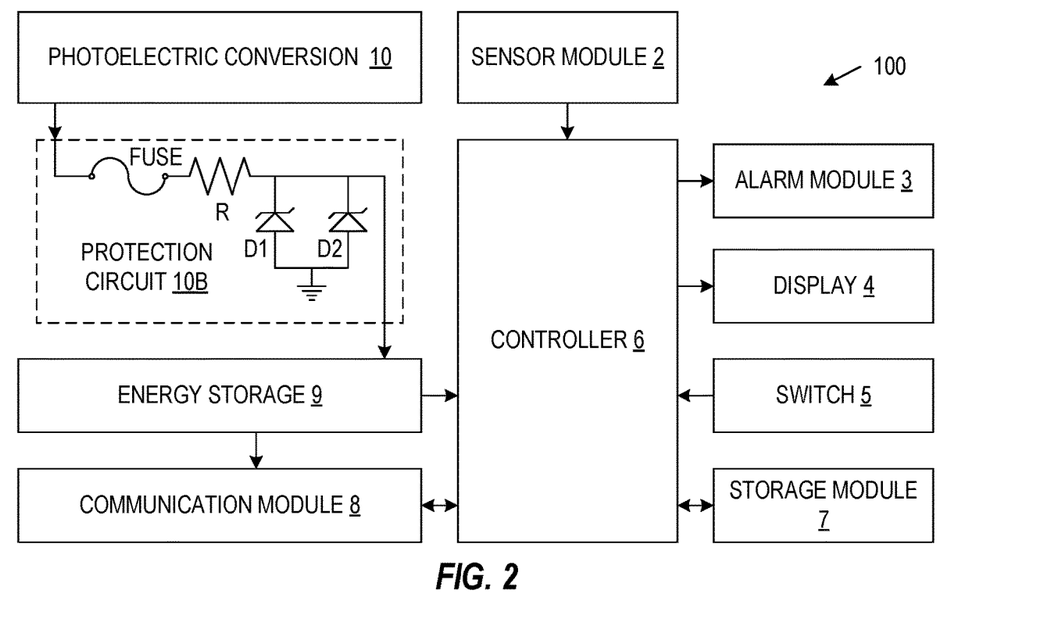
FIG. 2 is a block diagram illustrating external and internal components of the gas detector of FIG. 1.

FIG. 2 is a block diagram showing major internal and external components of gas detector 100. Detector 100 particularly includes components such as sensor module 2, alarm module 3, display 4, and switch 5 as described above and further includes a controller 6, a storage module 7, a communication module 8, an electric energy storage device 9, and a photoelectric conversion component 10, which may be protected inside of housing 1.

Photoelectric conversion component 10, which may include a photocell, an organic or semiconductor photovoltaic cell, or other device that converts the light energy into electrical energy by the photovoltaic effect. In particular, photoelectric conversion component 10 may receive ambient light from a working environment and convert the ambient light into electrical energy that that extends the working time of the detector. Photoelectric conversion component 10 electrically connects to and provides power to and through electrical energy storage device 9. Electric energy storage device 9 may be a super capacitor, a rechargeable battery such as an lithium-ion battery, or any component capable of storing and providing electrical power. An isolation protection circuit 10B may be provided between photoelectric conversion component 10 and electric energy storage device 9 to prevent high voltages or large currents from damaging either component 9 or 10. As shown in FIG. 2, isolation protection circuit in an example implementation includes a fuse, a current limiting resistor R, and voltage regulator diodes D1 and D2. Electric storage device 9 and photoelectric conversion component 10 electrically connect and provide power the components of detector 100 including sensor module 2, alarm module 3, display 4, controller 6, storage module 7, and communication module 8. In the illustrate configuration of FIG. 2, controller 6 electrically connects and may communicate with or convey information signals or electrical power to communication module 8, storage module 7, sensor module 2, alarm module 3, display screen 4, and switch 5.

Controller 6 provides overall control functions for operation of gas detector 100 and may particularly execute software or firmware from storage module 7, receive and process sensing signals from sensor module 2, store sensing data in module 7, transmit sensing data or other communications through communication module 8, activate alarm module 3 to produce an alarm or warning in response sensing of alarm levels of particular gases, and operate display screen 4 to present information to the user or receive user commands from the user. Controller 6 in an example configuration is a single chip microcomputer, which may include other components such as storage module 7 as on-chip data storage.

Communication module 8 provides or implements external wired or wireless communications. For wired communications, communication module 8 may be, for example, an industry standard component such as an RS232, RS485, UART, SPI, or I2C module. For wireless communication, communication module 8 may include an IrDA, NFC, RFID, WiFi, ISM, Bluetooth or GPRS module, adapter, or transceiver. For example, communication module 8 in the photoelectrically-charging gas detector 100 can be a built-in IrDA transmitter and receiver for Infrared signals, or a built-in BLE (Bluetooth Low Energy) wireless module or a built-in NFC (Near Field Communication) module or RFID (Radio Frequency IDentification) wireless module. The communication module 8 may be used to connect or link gas detector 100 to network 33 or a remote user terminal or station 32. An external user terminal or station 32, which may be a computer or a mobile device terminal, may provide a user interface for operation of detector 100 or may collect, process, or store sensor data or other information from detector 100 and other devices or detectors (not shown) or particularly from a network including detector 100.

Gas detector 100 may particularly employ wireless communications when operating as portable or temporary gas detector. For example, in an emergency or cleanup situation at a facility, multiple gas detectors that are similar or identical to gas detector 100 may be setup for fence line monitoring around the perimeter of an area where work is to be performed, e.g., around an outdoor cleanup location. Each gas detector 100, for example, may be mounted on a fence using bolts or magnets or mounted on mobile tripods or other mobile mounting structures that are placed to surround the work area. Gas detectors 100 may, thus, be quickly placed whenever and wherever gas detection may be needed without the need to have installed power or communication lines. With wireless capabilities, the communication module 8 in each gas detector 100 can communicate with other gas detectors or with a network at the facility. Further, each gas detector 100 has a photoelectric conversion component 10 that is exposed to ambient sunlight or manmade lighting at the work area and can maintain power for continue operation of gas detector 100 for an extended period of time, e.g., days, weeks, months, or even years while work at the work area is completed, without requiring maintenance for recharging. In contrast, to provide the required working time, conventional gas detectors might require wired power, very large batteries, or frequent maintenance to replace or recharge batteries.

Figure 3:
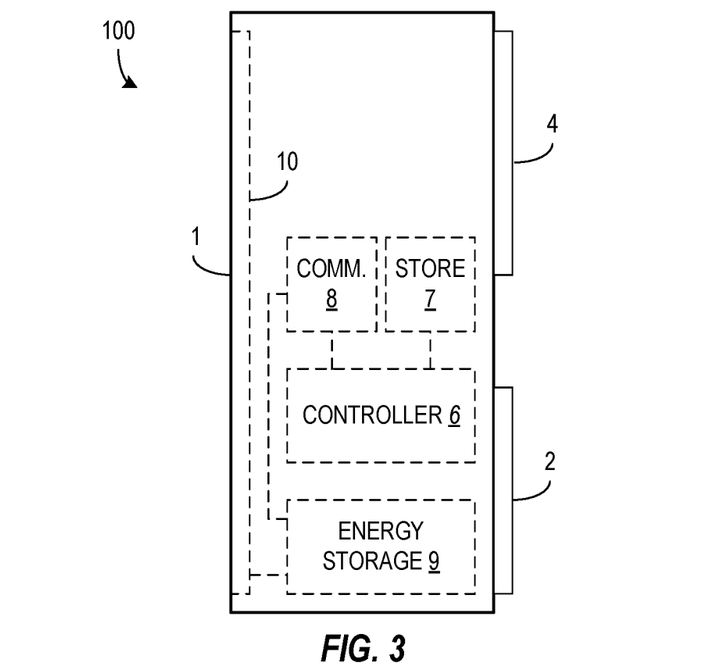
FIG. 3 is a side view illustrating internal and external components of a gas detector in accordance with one example of the present disclosure having an at-least-partly transparent housing and a photoelectric conversion component on an interior surface of a detector housing.

Housing 1, as described above, provides structure for mounting of components and may protect internally mounted components of the gas detector 100 from exposure to the environment. In some example implementations, housing 1 has a transparent structure either as a whole or in specific areas to allow internal mounting of photoelectric conversion component 10. Housing 1 may, for example, be made entirely of a transparent plastic or may contain a window of transparent material. In the example FIG. 3, housing 1 has transparent structure on at least on one wall, e.g., the back of housing 1, and photoelectric conversion component 10 is a flexible thin-film solar cell bonded to the interior side of the transparent wall of housing 1 using a transparent adhesive, e.g., polyurethane adhesive, or other transparent bonding structure. Photoelectric conversion component 10 may alternatively be bonded to the interior any one or more wall areas of housing 1 that transmits light, e.g., areas not shaded by display screen 4 or other opaque surface structure such as portions of sensor module 2 or alarm module 3. In an example configuration, photoelectric conversion component 10 is a flexible thin film solar cell bonded to the interior of the largest wall, thereby increasing the area of the flexible thin film solar cell that can be bonded and increasing the light receiving area.

Figure 4:
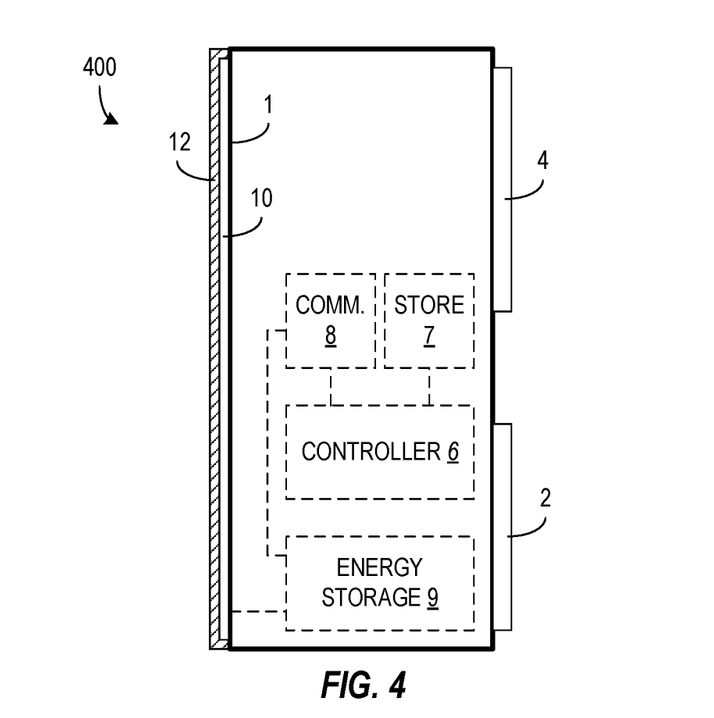
FIG. 4 is a side view illustrating internal and external components of a gas detector in accordance with an example of the present disclosure having a photoelectric conversion component on an exterior surface of a detector housing.

FIG. 4 shows another example of a gas detector 400 that may have the same components as detector 100 but does not require housing 1 to have a transparent structure. In detector 400, photoelectric conversion component 10 is a flexible film solar cell bonded to the outer side of the back or any wall of housing 1. In general, photoelectric conversion component should not cover display screen 4 or any structure requiring external access. A structural adhesive may be used to attach photoelectric conversion component 10 to the outside of housing 1. Photoelectric conversion component 10 may be a flexible thin film solar cell or a solar coating or layer that may wrap around corners to thereby increase the area of the flexible thin film solar cell and the light receiving area. In particular, photoelectric conversion component 10 may be a coating formed by solar paint. Solar paint, also known as paint-on solar or paintable solar, works the same as other photovoltaic cells by converting light energy into electrical energy. Solar paint may particularly contain tiny pieces of light-sensitive material suspended in a liquid, as in an ink or paint, and solar paint can be sprayed onto housing 1 to create a solar coating on any desired portion of housing 1. A transparent protective layer 12 is on the outer surface of flexible thin-film solar cell 10. Transparent protective layer 12 may, for example, be a polyethylene coating, an epoxy resin coating, or any material that is transparent and can protect flexible thin-film solar cell 10 from mechanical abrasion or chemical damage.

Figure 5:
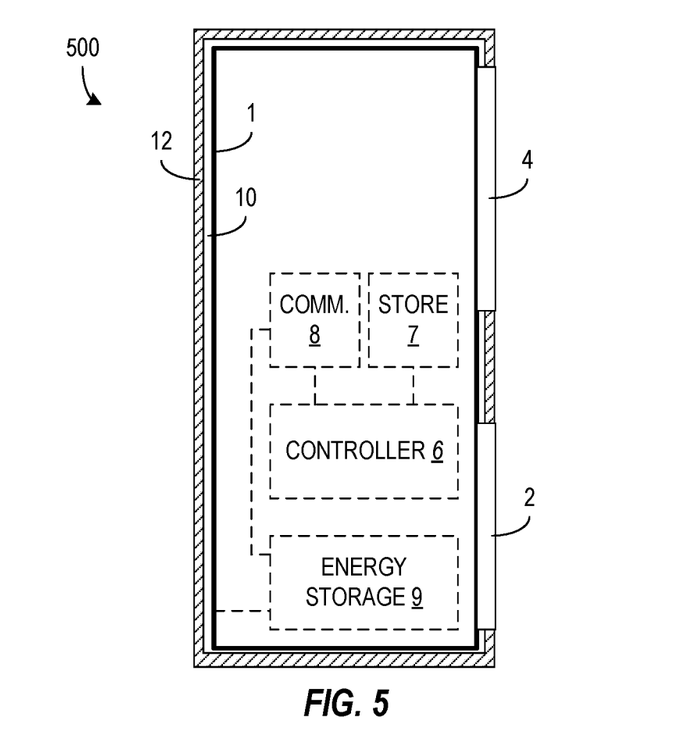
FIG. 5 is a side view illustrating internal and external components of a gas detector in accordance with an example of the present disclosure having a photoelectric conversion component extending on all or a majority of the surface of a detector housing.
Figure 6:
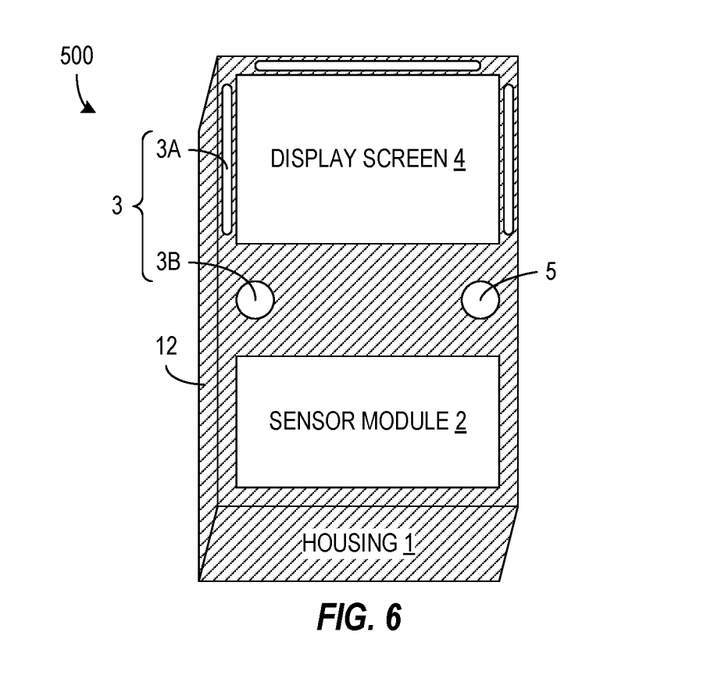
FIG. 6 is a perspective view of the gas detector of FIG. 5.

Photoelectric conversion component 10, e.g., a solar coating or layer, may cover up to the entire available area of the outer or interior surface of housing 1 to maximize the absorption of light energy. FIGS. 5 and 6, for example, show an example gas detector 500 in which the entire outer surface of housing 1, except where portions of detector components such as sensor module 2, alarm module 3, display screen 4, and switch 5 need external access, is covered with solar paint or a thin film solar cell 10 and a transparent protective layer 12. Housing 1 in gas detector 500 is not required to be transparent and does not required transparent structure. Alternatively, if housing 1 is transparent all or most of the interior surface of the housing may be covered with a thin film solar cell or solar paint.

Figure 7:
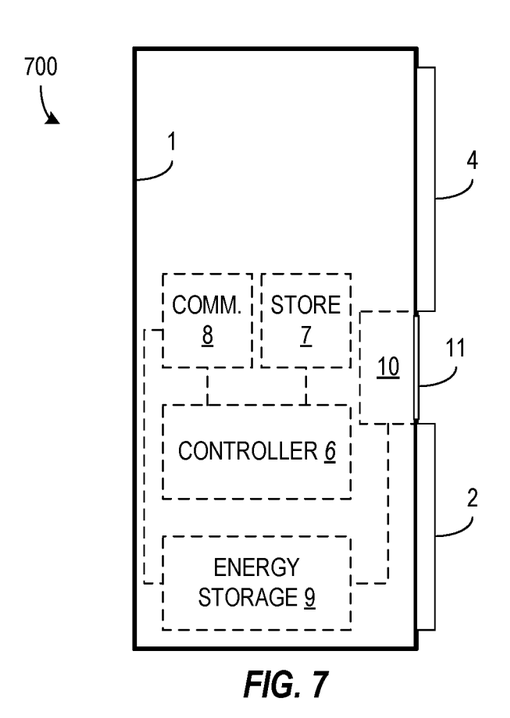
FIG. 7 is a side view illustrating internal and external components of a gas detector in accordance with an example of the present disclosure having a photocell or other photoelectric conversion component at the front of a detector housing.
Figure 8:
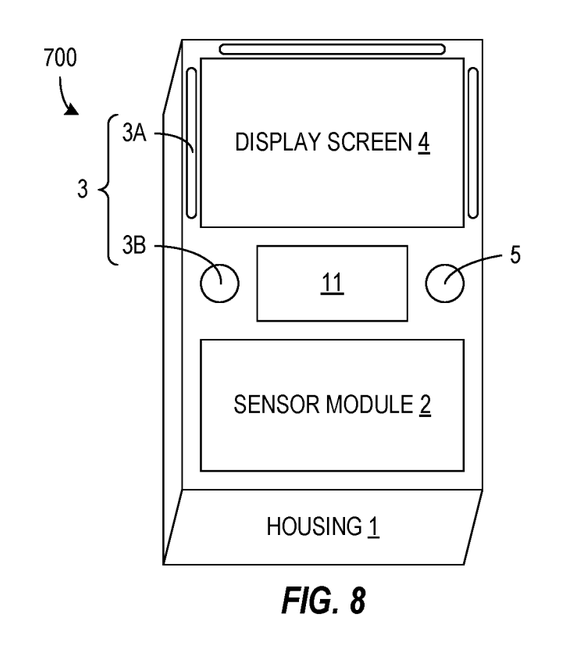
FIG. 8 is a perspective view of the gas detector of FIG. 7.

FIGS. 7 and 8 show side and front views of yet another example configuration for a gas detector 700 in accordance with the present disclosure. Gas detector 700 differs from gas detector 100 of FIGS. 1 and 3 in that photoelectric conversion component 10 of detector 700 is adjacent to a transparent window 11 on a front or top face of housing 1. Transparent window 11 may be transparent plastic or glass that is affixed in or covers an opening through the remainder of housing 1. In the illustrated configuration, transparent window 11 is between alarm horn 3B and switch 5 and between exposed portions of sensor module 2 and display screen 4. Photoelectric conversion part 10 may be inside housing 1 of gas detector 700 and connected with transparent structural adhesive solar cells bonded to the transparent window 11. The solar cell may be a polycrystalline silicon solar cell or a monocrystalline silicon solar cell, and the transparent structural adhesive may be polyurethane adhesive. Transparent window 11 protects photoelectric conversion component 10 from mechanical and chemical damage while transmitting light that photoelectric conversion component 10 converts to electrical energy. An advantage of having photoelectric conversion component 10 on or extending to a front face of housing 1, as in detectors 500 and 700, is that the detector may receive photoelectric power when placed on a flat surface with display screen 4 visible to a user using the detector.

Figure 9:
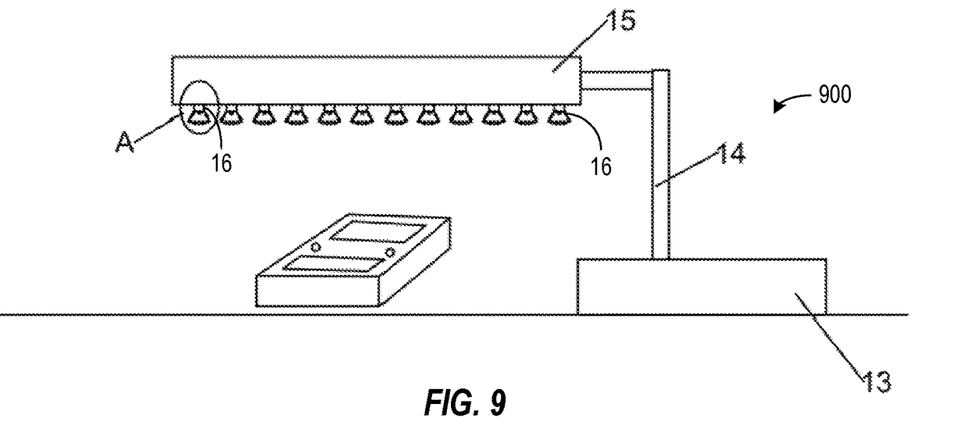
FIG. 9 shows a gas detecting system in accordance with one example of the present disclosure including a charger and a photo-electrically charging gas detector or detection and alarm instrument.

Examples of the gas detectors described above may convert light and use the generated power at the same time. The detectors, e.g., energy storage 9, may also be photoelectrically charged whether or not the detector is in use. FIG. 9 shows a system including a detector, which may be of any of the above disclosed examples, and a charger 900. Charger 900 is a separate structure from the detector and includes a base 13, a support rod 14 is fixed to base 13, and a lamp mounting base 15 is fixed to the top of the support rod 14. Multiple lamp sockets 16 are fixed to the bottom of mounting base 15, and a lamp source 17 is installed at the bottom of each lamp socket 16. External power connection, e.g., conventional electrical wiring, may run from a power source, e.g., conventional AC electrical outlet (not shown), through base 13, support rod 14, and mounting base 15 to lamp sockets 16. Each light source 17 may be an incandescent lamp, an LED lamp, a fluorescent lamp, an infrared laser diode, and a halogen lamp. Preferably, the light source 17 uses an infrared laser diode. For charging of the detector, lamp sources 17 are energized to provide light energy for the photoelectric conversion component 10 of the detector.

Figure 10:
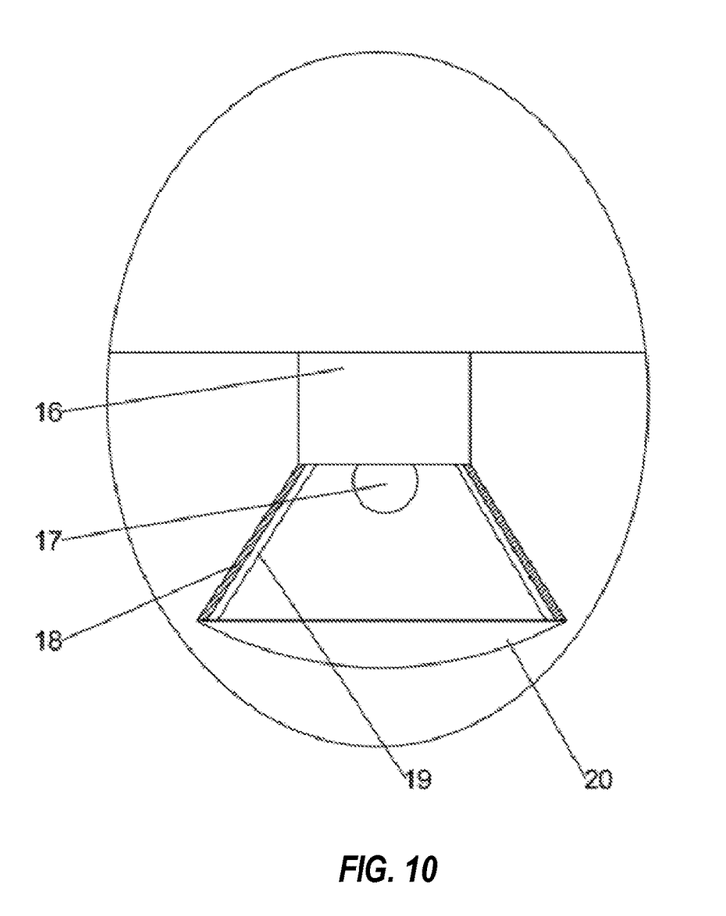
FIG. 10 shows an enlarged view of a portion A of the charger shown in FIG. 9.

FIG. 10 shows a portion A of charger 900, which includes a lampshade 18 affixed to a lamp socket 16. Lampshade 18 is generally cone-shaped and surrounds the outer periphery of a lamp source 17 with a larger opening of the cone-shaped lampshade 18 facing downward. A reflective or mirror layer 19 is provided on the inner wall of each lampshade 18, and a convex lens 20 may be fixed in or to the opening of lampshade 18 to concentrate the light from lamp source 17 into a small area where the detector may be placed for charging. Reflective or mirror layer 19 may be a plated layer, e.g., plated silver or aluminum, or any other material with high reflectivity.

A detector as noted above may be place in an area of concentrated light from charger 900 to power or charge the electric energy storage device 9, in particular, by illuminating the detector and with at least a portion of its photoelectric conversion part 10 facing the light source 17. The detector may be inactive during charging or may be operating to detect targeted gas or to communicate with external devices. For example, the detector may report its location or upload sensor data or logs to a network or terminal or may download from the terminal or network control information or software or firmware updates. Additionally, the sensor module 2 of the detector may continue to detect the concentration of one or more target gas and may transmit sensing data to controller 6, and controller 6 may transmit the sensor information to the user terminal through the communication module 8, may display the gas concentration on display screen 4, and when the gas concentration is higher than a threshold preset by controller 6, may direct the alarm horn 3B to sound and the LED lamp 3A to emit light, which is convenient for nearby staff to hear and see.

Figure 11:
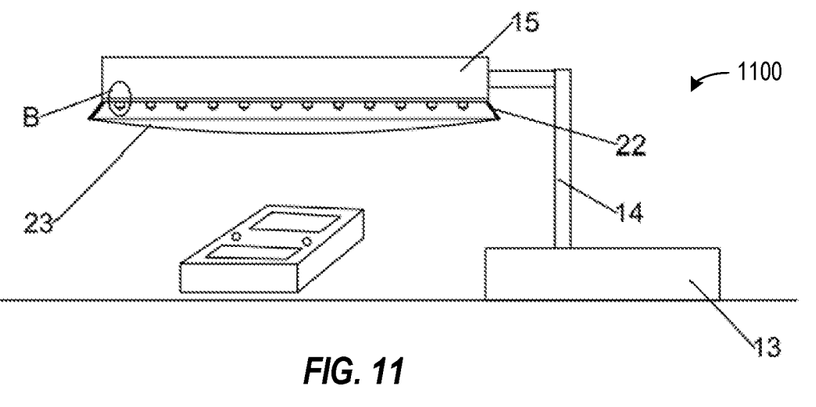
FIG. 11 shows a system in accordance with another example of the present disclosure including a charger and a photo-electrically charging gas detector or detection and alarm instrument
Figure 12:
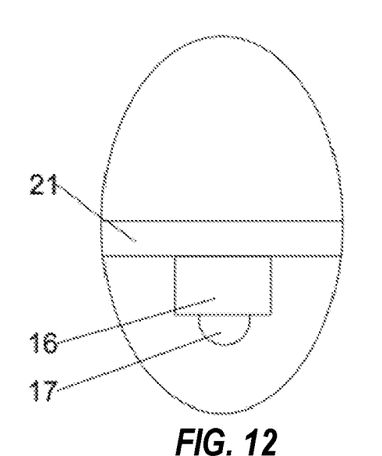
FIG. 12 is an enlarged view of a portion B of the charger shown in FIG. 11.

FIGS. 11 and 12 shows a gas detecting system with a charger 1100 that is similar to the structure of charger 900 shown in FIG. 9. The difference between charger 1100 and charger 900 is that charger 1100 has a reflective layer 21 provided on the outer wall of the bottom of the mounting base 15 and optionally on a lampshade 22 that surrounds all of the lamp sockets 16 and light sources 17. Lampshade 22 particularly extends around the periphery of all lamp sources 17 and has an open bottom in which a convex lens 23 may be set. Reflective or mirror layer 21 may be a coating plated or otherwise applied on the surface of mounting base 15 or lampshade 22. The material of the coating may be silver or aluminum or other materials with high reflectivity.

Figure 13:
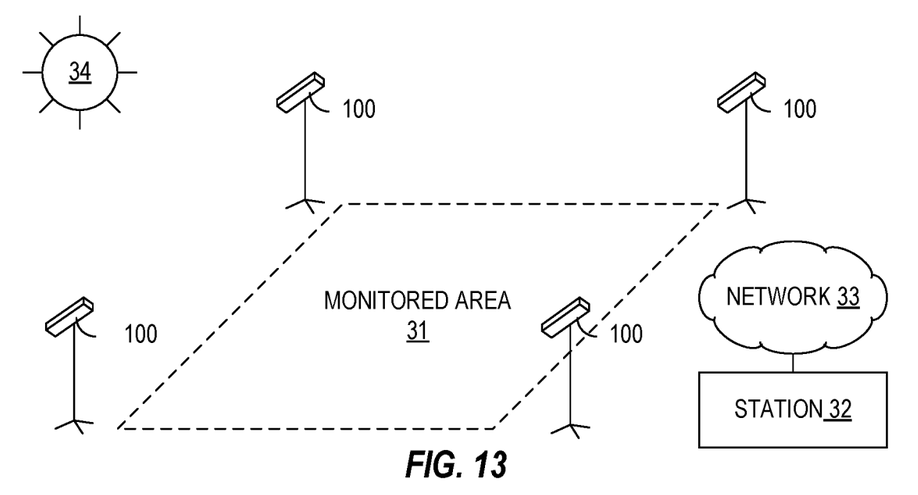
FIG. 13 illustrates a fence line monitoring system in accordance with an example of the present disclosure.

FIG. 13 shows a gas detection system 30 including gas detectors 100 that may be rapidly deployed for "fence-line" monitoring of a monitored area 31. Gas detectors 100 are rapidly deployed in that they may be placed, e.g., mounted on a wall, fence, or portable mount, without requiring wiring for power or data signals. Monitored area 31 may be any area in which one or more target gases may be present or generated, e.g., a work site. Each gas detector 100 may be placed near a perimeter of monitored area 31 and may operate to detect or measure the target gases, generate an alarm such as an audible noise or flashing light when any of the target gases is detected at a concentration above an alarm level, and wirelessly transmit data such as concentration measurements to a remote station 32 via a network 33 that may be provided at a facility including monitored area 31. In accordance with an aspect of the current disclosure, gas detectors 100 may continue to monitor area 31 for an extended working time, e.g., more than a day, week, month, or year, using only the initial power stored in the energy storage unit of the detector and the power that the photoelectric conversion component of the gas detector 100 extracts from ambient light from light sources 34 such as the sun or man-made light sources.

The gas sensing systems and methods disclosed herein may provide many advantages over conventional systems and methods. Examples of detectors as disclosed herein may increases the working time of the detector without increasing the battery capacity but instead by adding a photoelectric charging function to receive external light, e.g., ambient light, to charge the instrument or power operation of the instrument or receive light from a charger to recharge or extend operation. The photoelectric capabilities of the detectors also provide charging with the charger, which can charge the instrument even on cloudy days or at night. Examples of the charger of the present disclosure may enhance light intensity through use of the convex lens and reflective or mirror layers that improve charging efficiency. The photoelectric conversion component of the examples disclose herein may be connected with an isolation protection circuit, which can limit the output current, voltage and power, and meet the requirements of explosion-proof and intrinsic safety design. Further, the photoelectrical charging and with built-in communications allows an instrument housing or enclosure to be completely, e.g., hermetically, and permanently sealed to maximize the instrument's ingress rating and operation durability.

Each of modules disclosed herein may include, for example, hardware devices including electronic circuitry for implementing the functionality described herein. In addition or as an alternative, each module may be partly or fully implemented by a processor or controller executing instructions encoded on a machine-readable storage medium.

Although particular implementations have been disclosed, these implementations are only examples and should not be taken as limitations. Various adaptations and combinations of features of the implementations disclosed are within the scope of the following claims.

What is claimed is:

1. A gas detecting system including:
a detector, the detector comprising:
  a sensor module configured to sense a target gas;
  a controller connected to receive a signal from the sensor module;
  energy storage providing electrical power the controller and the sensor module;
  a housing for the sensor module, the controller and the energy storage; and
  a photoelectric cell on the housing and providing electrical power to the energy storage while the energy storage powers the controller and the sensor module; and
a charger separate from the detector, the charger comprising:
  a base;
  a support rod extending from the base;
  a lamp base fixed to a top of the support rod; and
  a plurality of lamp sources installed at a bottom of the lamp base, the lamp sources being configured to provide light in an area of the photoelectric cell when the detector is positioned under the lamp base.

2. The system of claim 1, wherein each of the lamp sources comprises one of an incandescent lamp, an LED lamp, a fluorescent lamp, an infrared laser diode, and a halogen lamp.

* * * * *